United States Patent
Sega et al.

[11] Patent Number: 5,862,011
[45] Date of Patent: Jan. 19, 1999

[54] PC CARD TYPE MAGNETIC DISK DEVICE

[75] Inventors: Masahiko Sega; Tomio Suzuki, both of Hiratsuka; Tsuyoshi Takahashi; Hiroyuki Mitsuhashi, both of Odawara; Tetsuo Yuki, Hiratsuka; Takashi Matsuki, Odawara, all of Japan

[73] Assignee: Hitachi, Ltd., Tokyo, Japan

[21] Appl. No.: 699,425

[22] Filed: Aug. 19, 1996

[30] Foreign Application Priority Data

Aug. 24, 1995 [JP] Japan ................................. 7-216363

[51] Int. Cl.⁶ .................................................. G11B 5/012
[52] U.S. Cl. .................................. 360/98.01; 360/97.02; 360/106
[58] Field of Search ............................. 360/97.01–98.01, 360/98.07, 98.08, 99.06, 99.08, 99.12, 104–106, 137

[56] References Cited

U.S. PATENT DOCUMENTS

| | | | |
|---|---|---|---|
| 5,276,577 | 1/1994 | Brooks et al. | 360/97.02 |
| 5,363,262 | 11/1994 | Drennan | 360/106 |
| 5,420,733 | 5/1995 | Knighton et al. | 360/97.01 |
| 5,423,612 | 6/1995 | Zang et al. | 384/119 |
| 5,488,523 | 1/1996 | Seaver et al. | 360/99.12 |
| 5,500,779 | 3/1996 | Diel | 360/97.01 |
| 5,502,604 | 3/1996 | Furay | 360/97.01 |
| 5,546,250 | 8/1996 | Diel | 360/97.02 |
| 5,582,411 | 12/1996 | Tyler | 360/97.02 |
| 5,590,004 | 12/1996 | Boutaghou | 360/99.12 |
| 5,590,006 | 12/1996 | Shafe | 360/105 |
| 5,600,509 | 2/1997 | Kawakami | 360/97.02 |
| 5,606,472 | 2/1997 | Akagi et al. | 360/97.01 |
| 5,625,512 | 4/1997 | Smith | 360/103 |
| 5,627,698 | 5/1997 | Malek | 360/75 |
| 5,654,847 | 8/1997 | Yagi et al. | 360/97.02 |

FOREIGN PATENT DOCUMENTS

| | | |
|---|---|---|
| 671741 | 9/1995 | European Pat. Off. . |
| 62-279587 | 12/1987 | Japan . |
| 6-84302 | 3/1994 | Japan . |
| 6-215554 | 8/1994 | Japan . |
| WO93/10535 | 5/1993 | WIPO . |
| 94/06115 | 3/1994 | WIPO . |
| 94/11873 | 5/1994 | WIPO . |
| 9422133 | 9/1994 | WIPO . |
| 9502247 | 1/1995 | WIPO . |

*Primary Examiner*—Jefferson Evans
*Attorney, Agent, or Firm*—Fay,Sharpe,Beall, Fagan,Minnich & McKee

[57] ABSTRACT

A magnetic disk device has a large capacity with a small and thin structure and includes a spindle system, an actuator system, a control package for controlling the systems, and a PCMCIA connector. The spindle system is of an in-hub structure wherein two magnetic disks are rotated in inside diameter portions of the magnetic disks. The actuator system has sliders mounting magnetic heads for writing and reading magnetic information to and from the magnetic disks, guide arms and suspension structures. The suspension structures also include a coil, a magnetic circuit for imparting a drive force in cooperation with the coil, a coil holder for supporting the coil, a pivot sleeve for rocking the guide arms, the coil holder and spacers which are integrally laminated to each other, bearings and a pivot shaft. The PCMCIA connector connects to the control package and is fixed by the housing and a package cover.

13 Claims, 14 Drawing Sheets

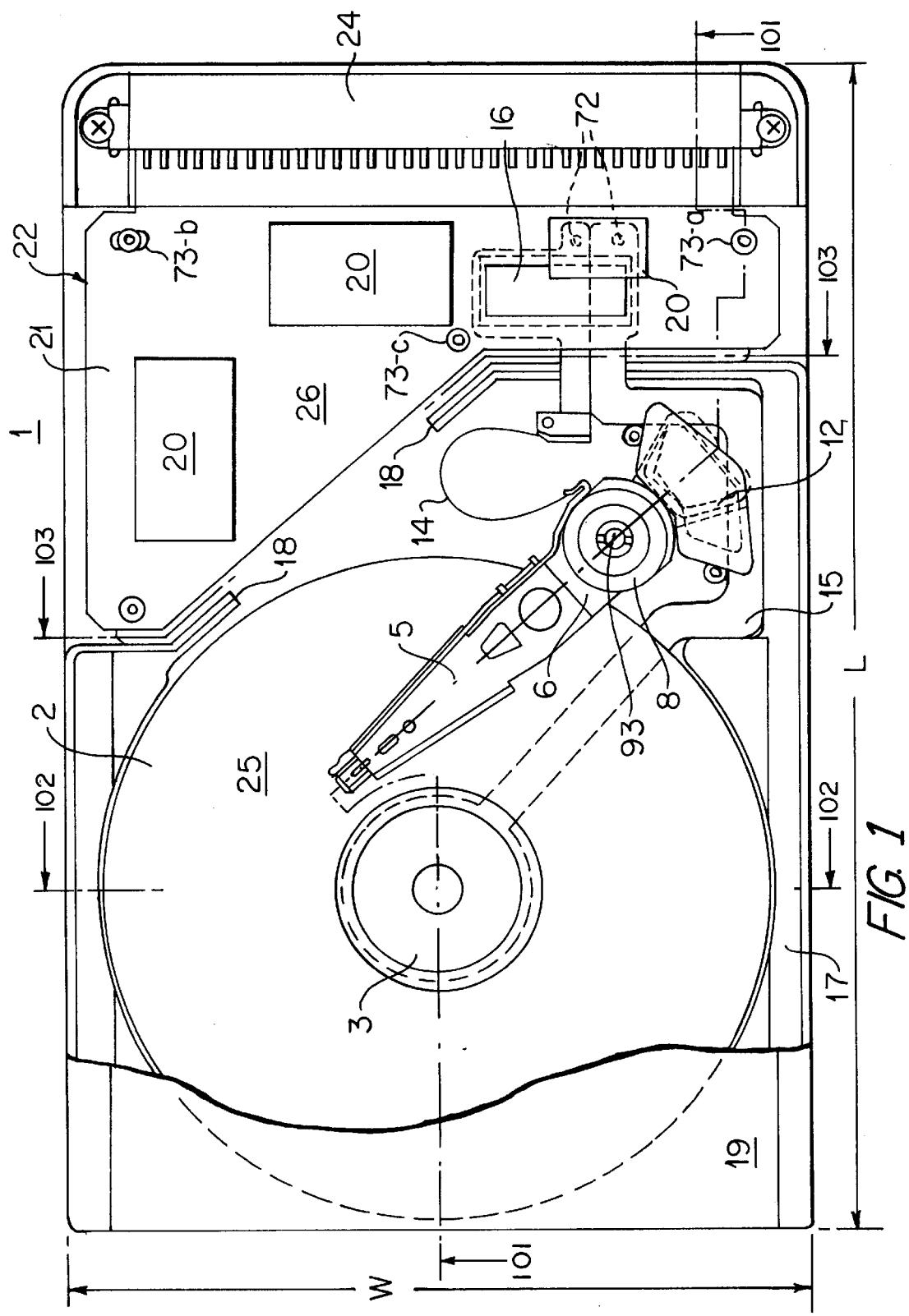

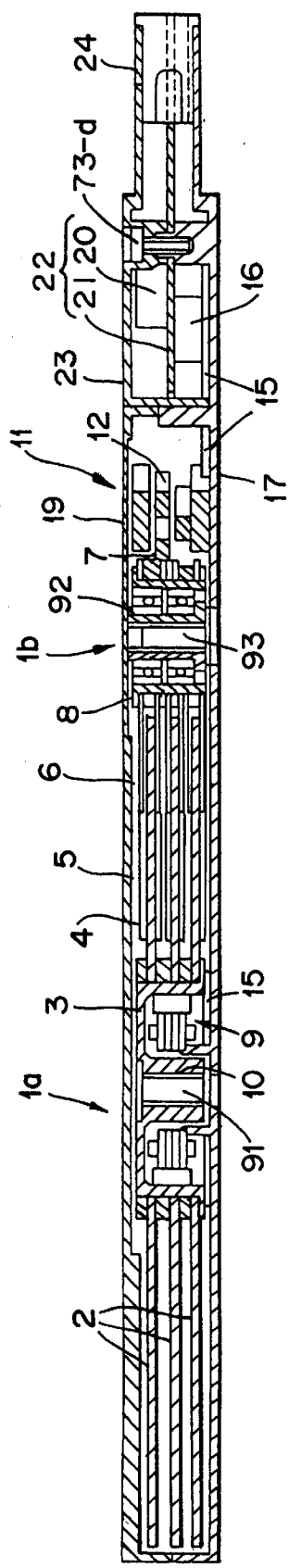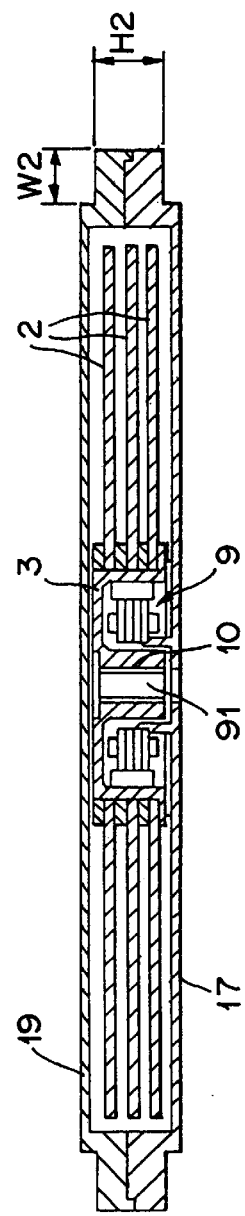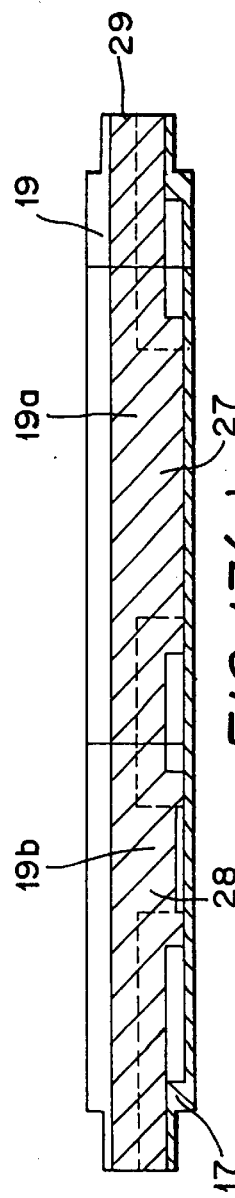
FIG. 13(a)
FIG. 13(b)
FIG. 13(c)

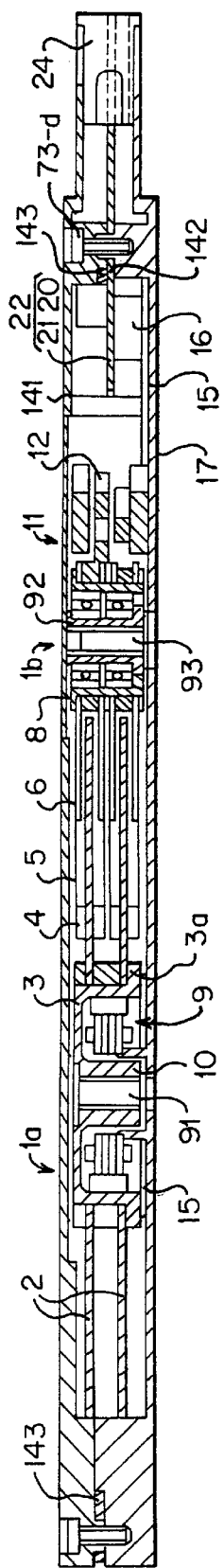
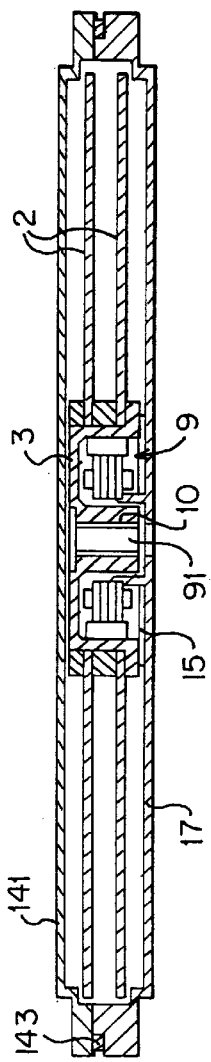
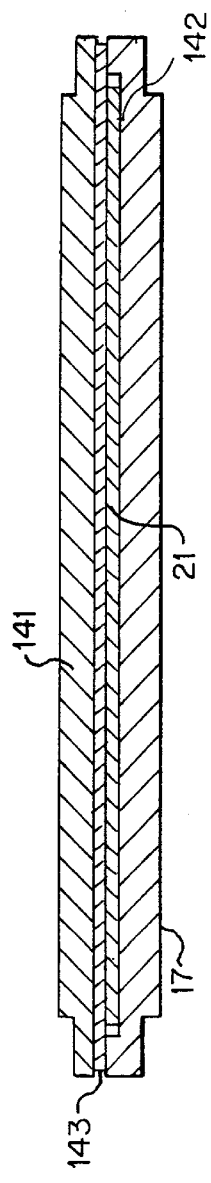
FIG. 18(a)
FIG. 18(b)
FIG. 18(c)

PC CARD TYPE MAGNETIC DISK DEVICE

FIELD OF THE INVENTION

The present invention relates to a magnetic disk device, and in particular to a magnetic disk device having a large capacity and high reliability with a small and thin structure.

BACKGROUND OF THE INVENTION

Magnetic disk devices tend to increase in memory density and capacity every year, and are expected to be used in many applications other than just as large external memory devices added to a conventional general computer system or personal computer. For example, proposed uses for a magnetic disk device include mounting it in a portable small-sized information processing apparatus, which allows a user to carry necessary data recorded in the magnetic disk device outdoors.

If a magnetic disk device is to be mounted in a portable small-sized information processing apparatus, however, it is essential to make the magnetic disk device small and thin. In this regard, the goal of magnetic disk device design is aimed at reducing the size of the device so that it satisfies a size (thickness: 5 mm or less) requirement of a so-called PC card specification of PCMCIA (Personal Computer Memory Card International Association)/JEIDA (Japan Electronic Industry Development Association) and the like. A variety of mechanisms have been disclosed for satisfying such a device thickness of 5 mm or less in a magnetic disk device using a small diameter disk having a diameter of 1.8 inch.

For example, International Publication No. WO93/10535 discloses a thin magnetic disk device having a device thickness of 5 mm that is intended to be realized by holding a 1.8 inch disk between electronic parts mounted between printed circuit boards and the inner surfaces of a housing and a cover. In this technique, the electronic parts are mounted on a thin printed circuit board rather than a conventional thick one, and they are arranged on both sides of a thin disk having a relatively large space in the thickness direction, to thus make thin the total thickness of the device. This technique also adopts a spindle motor structure wherein two ball bearings can be mounted in a small inside diameter (12 mm) portion of the 1.8 inch disk along the spindle axis and also a magnet rotor that can be contained in a hub of the disk by the effect of using a face-to-face spindle motor, to thus achieve a magnetic disk device.

In Japanese Patent Laid-open No. Hei 6-84302, a thin actuator is disclosed that is intended to be realized by axially stacking and clamping a so-called guide arm integrated type suspension in which a suspension mounting a magnetic disk/slider is welded to a guide arm, a coil holder for supporting a coil and a spacer, around a sleeve of a pivot bearing of an actuator. The guide arm integrated type suspension is made thin by welding a suspension mounting a magnetic head to a thin guide arm.

At present, the supporting of a suspension on a guide arm is generally performed by welding a cylindrical member to an end portion of the suspension, inserting the cylindrical member of the suspension in a hole provided at the leading end of the guide arm, and fastening the hole by caulking. In this case, a so-called integrated carriage integrating a plurality of the guide arms is generally used. In the method of fastening the suspension to the guide arm, the suspension is inevitably required to be relatively thick for obtaining a practical holding force. Consequently, the technique disclosed in Japanese Patent Laid-open No. Hei 6-84302 in which a suspension only has a thickness sufficient to be welded to a guide arm is advantageous for making a thin suspension.

Incidentally, a housing and cover containing a magnetic disk is required to be sealed for realizing a highly reliable magnetic disk device. In a technique disclosed in U.S. Pat. No. 5,276,577/Japanese Patent Laid-open No. Hei 6-215554, the sealing performance at a mating portion between the housing and the cover and at an extension portion of the FPCs (flexible printed circuit board), a gap is formed that is simply covered using a tape seal having a constant width. on the other hand, as disclosed in Japanese Patent Laid-open No. Sho 62-279587, a packing is held between a flat housing and a cover, to maintain the sealed housing area.

SUMMARY OF THE INVENTION

In each of the above-described prior art references, only one magnetic disk is mounted in a magnetic disk device having a device thickness of 5 mm or less.

Specifically, in the above disclosed International Publication No. WO93/10535, since a 1.8 inch disk has a small inside diameter (12 mm), two ball bearings are mounted in the inside diameter portion of the magnetic disk along the spindle axis and a magnet rotor is contained in a hub of the disk using a face-to-face type spindle motor. However, as is apparent from the drawing disclosed in the embodiment, a coil stator protrudes from the inside diameter portion of the magnetic disk because the inside diameter portion thereof has a small mounting space. As a result, the mounting of two or three magnetic disks would be obstructed by the presence of the coil stator.

In the above disclosed Japanese Patent Laid-open No. Hei 6-84302, the configuration of a guide arm integrated type suspension in its thickness direction is such that a magnetic head and a guide arm are arranged on both sides of a plate-like suspension. The thickness of the guide arm integrated suspension is thus expressed by a total of thicknesses of [magnetic head+suspension+guide arm]. With this technique having the above dimensional relation, it is difficult to mount four or five heads corresponding to two to three magnetic disks in a magnetic disk device having a thickness of 5 mm or less.

It is desirable, in order to mount two or three magnetic disks in a magnetic disk device having a thickness of 5 mm or less, and to prevent permeation of gas from a package for ensuring a high reliability of an HDD, that an area containing disks and an actuator (hereinafter, referred to as a "disk/actuator chamber") be separated from an area containing the package (hereinafter, referred to as a "package chamber") insofar as it is possible and to ensure a good seal of the disk/actuator chamber. However, since a shape of the wall for separating the disk/actuator chamber from the package chamber is complicated, the above desirable purpose cannot be achieved using a tape seal structure as disclosed in U.S. Pat. No. 5,276,577/Japanese patent Laid-open No. Hei 6-215554 wherein the entirety of the HDA is wrapped with a simple tape seal having a constant width.

Even in the case where a disk/actuator chamber and a package chamber are sealed together for preventing the generation of gas, for example, by increasing a mounted amount of active carbon, the sealing performance of the package must be examined. Such a seal cannot be achieved using a simple flat packing structure of the type disclosed in Japanese Patent Laid-open No. Sho 62-279587. That is, in order to separate a disk/actuator chamber from a package chamber and to seal the disk/actuator chamber, a recessed portion for head loading must be provided in a wall for separating the disk/actuator chamber from the package chamber. Accordingly, a good seal of the disk/actuator cannot be achieved using a simple flat packing structure of the type disclosed in Japanese Patent Laid-open No. Sho 62-279587.

An object of the present invention is to provide a magnetic disk device capable of achieving a large memory capacity with a small and thin structure.

Another object of the present invention is to provide a magnetic disk device capable of having a good seal for the magnetic disk containing portion, thereby ensuring a high reliability of the device.

A further object of the present invention is to provide a magnetic disk device capable of ensuring a large memory capacity with a small and thin structure, which is substantially adaptable to a specification of PCMCIA/JEIDA or the like and is usable with a PC by being detachably mounted in a PC card slot.

To achieve the above objects, according to the present invention, there is provided a magnetic disk device having the following structure.

Specifically, to mount two or three magnetic disks in a magnetic disk device having a thickness of 5 mm or less, a spindle bearing and a spindle motor are required to be contained in inside diameter portions (diameter: 12 mm) of 1.8 inch disks. To satisfy such a requirement, a magnetic disk device of the present invention adopts an in-hub structure in which a motor space is ensured in inside diameter portions of magnetic disks using a dynamic bearing.

The magnetic disk device of a preferred embodiment of the present invention also has an actuator structure wherein the configuration of the guide arm integrated type suspension, in the thickness direction thereof, is configured such that a magnetic head and a guide arm are arranged on the same surface of a suspension. The thickness of the actuator is thus expressed by a total of thicknesses of [magnetic head+suspension]. As a result, the actuator can be made thin. In this actuator structure, however, a head having a size that is equal to or smaller than a "nano-slider" specified by the International Disk Drive Association (IDEMA) is required to be used for mounting four heads corresponding to two magnetic disks in a magnetic disk device having a thickness of 5 mm or less. Further, a head having a size being equal to or smaller than a "pico-slider" specified by IDEMA is required to be used for mounting six heads corresponding to three magnetic disks in a magnetic disk device having a thickness of 5 mm or less.

In the magnetic disk device of the present invention, a disk/actuator chamber is separated from a package chamber and is sealed using a tape seal having a width portion that is partially extended (described later). With respect to the separation of the disk/actuator chamber from the package chamber, it is performed using a housing rib, a disk/actuator cover, and a package cover. While the housing rib and the disk/actuator cover must contribute to seal the disk/actuator chamber, the package cover is aimed to protect the control package and is not required to seal it. The sealing of the disk/actuator chamber is basically performed by the disk/actuator cover and the housing, and a tape seal adhered on the housing rib. In addition, the following techniques are utilized for sealing.

I. In the case where a cutout portion for head loading is formed in a housing rib, a projection for closing the cutout portion is formed on a disk/actuator cover, and a tape seal having a width portion selectively extended in accordance with a stepwise bent mating portion between the cutout portion and the projection is adhered on the mating portion, thus ensuring a good seal of the mating portion.

II. In the case where a cutout portion for extending FPCs (for transmission/reception of an R/W signal, and for supplying current to a spindle motor and to an actuator motor) is formed in a housing rib, a projection for closing the cutout portion is formed on a disk/actuator cover, and a tape seal having a width portion selectively extended in accordance with a stepwise bent mating portion between the cutout portion and the projection is adhered on the mating portion, thus ensuring a good seal of the mating portion.

III. In the case where a through-hole for extending FPCs from a disk/actuator chamber to a package chamber is formed in a lower portion of a housing portion, the through-hole is closed with an adhesive, thus ensuring a good seal of the through-hole.

Additionally, in the case where a disk/actuator chamber and a package chamber are sealed together using a packing, a groove having a depth corresponding to a thickness of a circuit board of a control package is formed in a portion of a mating face of a housing to a cover, and the control package is adhesively fitted in the groove such that a main surface of the circuit board is at the same level as that of the mating face of the housing. A packing is held between the mating surface of the housing including the main surface of the circuit board and the cover, to thus ensure a good seal therebetween. The disk/actuator chamber separated from the package chamber is sealed by holding a packing between a housing rib that projects from the housing for surrounding the disk/actuator chamber and the disk/actuator cover, to thus ensure a good seal therebetween. In the case of forming a head loading portion (recessed portion) in a portion of the housing rib, the mating face of the head loading portion to the projection formed in the disk/actuator cover is formed in a slant face such that both ends of the head loading portion are smoothly shifted to the height of the housing rib. A packing is then smoothly mounted along the slant surface, to ensure a head loading space as well as a high reliability in sealing. FPCs are held together with the packing to ensure a high sealing performance of the extending portion, or they are extended and sealed using the technique III, described above. In the case where the disk/actuator chamber and the package chamber are sealed together, since the amount of gas generation is increased, a large amount of a gas absorbing material such as active carbon is required to be used.

The spindle portion of the present invention is of an in-hub structure in which a motor space can be ensured in inside diameter portions of magnetic disks using a dynamic bearing, so that two or three magnetic disks can be mounted in a magnetic disk device having a thickness of 5 mm or less. The actuator portion of the present invention is of a stack structure using a guide arm integrated suspension and further it adopts a slider being equal to or smaller than a nano-slider, so that four magnetic heads corresponding to four recording faces of two magnetic disks can be mounted in a magnetic disk device having a thickness of 5 mm or less. Moreover, by the use of a slider equal to or smaller than a pico-slider, six magnetic heads corresponding to six recording faces of three magnetic disks can be mounted in a magnetic disk device having a thickness of 5 mm or less. Thus, it is possible to realize a magnetic disk device having a large capacity with a small and thin structure.

In the present invention, the reliability of the sealing structure can be ensured adhering a tape seal on a mating portion between a cutout portion provided in a housing rib for head loading or for FPC routing and a projection formed on a disk/actuator cover, the tape seal having a shape selectively extended to cover the mating portion. In the case where a FPC through-hole bypassing a lower portion of a housing rib is provided, a high sealing performance can be ensured by closing the through-hole with an adhesive. In the case where a packing is held between a housing and a cover or between a housing rib and a disk/actuator cover, a high sealing performance due to the packing held at the mating face can be ensured by making smooth the gradient of the mating face in the height direction. FPCs can be held at the mating face together with the packing, and thus they can be extended through the mating face, to provide a good seal at the mating face ensured.

Thus, it becomes possible to ensure that the magnetic disk device is adequately sealed so that dust does not permeate from the exterior to the inside of a head/disk assembly, resulting in a high reliability.

BRIEF DESCRIPTION OF THE DRAWINGS

FIG. 1 is a plan view of a first embodiment of a magnetic disk device of the present invention, partially cut away to shown details of the interior parts;

FIGS. 13(a), 13(b) and 13(c) are sectional views taken along lines 201—201, 202—202 and 203—203, respectively, shown in FIG. 12;

FIGS. 18(a), 18(b) and 18(c) are sectional views taken along lines 301—301, 302—302 and 303—303, respectively, as shown in FIG. 17;

DETAILED DESCRIPTION OF THE PREFERRED EMBODIMENT

Hereinafter, embodiments of the present invention will be described in detail with reference to the drawings.

Embodiment 1

Figure 2A:
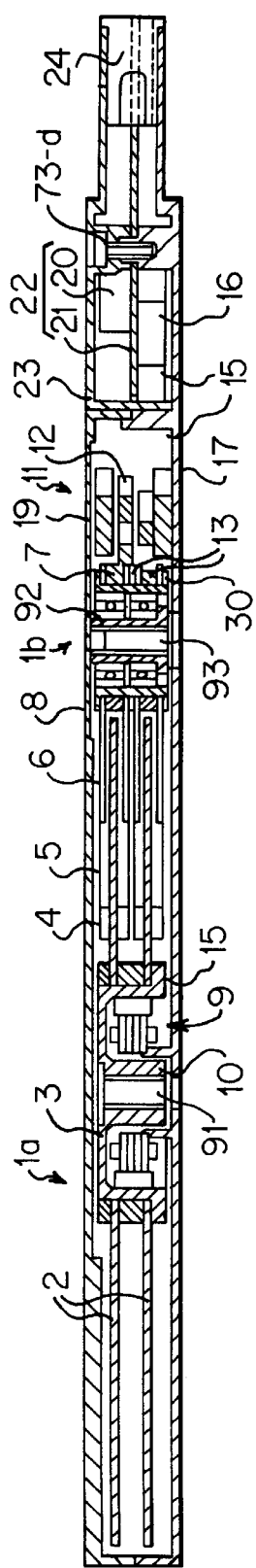
FIGS. 2(a), 2(b) and 2(c) are sectional views taken along lines 101—101, 102—102 and 103—103, respectively, shown in FIG. 1.
Figure 2B:
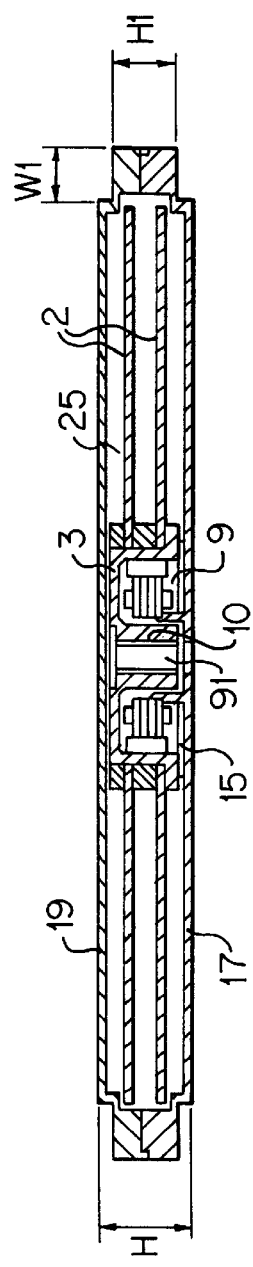
Figure 2C:
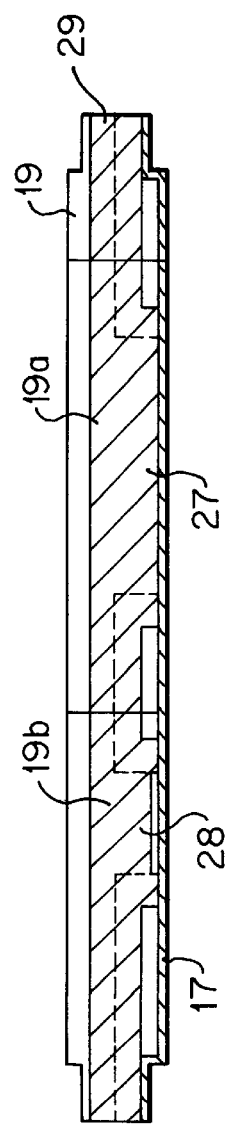

FIG. 1 is a plan view of a configuration of one embodiment of the magnetic disk device of the present invention, partially cutaway to show interior parts thereof. FIGS. 2(a), 2(b) and 2(c) are sectional views taken on lines 101—101, 102—102, and 103—103 of FIG. 1, respectively.

Referring to FIG. 1 and FIGS. 2(a) to 2(c), a magnetic disk device 1 includes a head/disk assembly (HDA) having components A and B. The component A is a spindle system 1a including two magnetic disks 2; a spindle 3 contained in inside diameter portions of the magnetic disks 2 and rotating the integrally laminated magnetic disks 2; a spindle motor 9; a dynamic bearing 10; and a spindle shaft 91. The component B is an actuator system 1b including sliders 4 mounting transducers for writing and reading magnetic records to and from the magnetic disks 2 and constituting magnetic heads; suspensions 5 for supporting the sliders 4; guide arms 6 each being fixed together with the slider 4 on the same side of the suspension 5; a coil 12; a magnetic circuit 11 for generating a drive force in cooperation with the coil 12; a coil holder 7 for supporting the coil 12; a pivot sleeve 8 for rocking the guide arms 6, the coil holder 7 and spacers 13 which are integrally laminated with each other; bearings 92; and a pivot shaft 93. The magnetic disk device 1 further includes components C, D, E, F and G. The component C includes a head/coil FPC 14 (flexible printed circuit board) collectively forming a plurality of leads (not shown) for transmitting weak electric signals generated when the magnetic heads read and write information recorded on the magnetic disks 2 and a lead for feeding a current to the coil 12; a motor FPC 15 for feeding a current to the spindle motor 9; and a connector 16. The component D is a disk/actuator chamber 25 including a housing 17 for supporting the spindle system 1a and the actuator system 1b; a housing rib 18; and a disk/actuator cover 19. The component E is a control package 22 assembled by integrated circuit elements 20 such as an IC and LSI, electronic circuit parts (not shown) other than the integrated circuit elements 20, and a circuit board 21. The component F is a package chamber 26 including the housing 17 and a package cover 23. The component G is a PCMCIA connector 24 fixed by the housing 17 and the package cover 23.

The outer dimensions of the magnetic disk device 1 in this embodiment are, for example, set as follows: a total length L=85.6 mm, width W=54.0 mm, device thickness H=4.9 mm, thickness H1 of each of projections provided on both the ends of a main body in the longitudinal direction=3 mm, and width of the projection W1=3 mm. These dimensions of the magnetic disk device 1 satisfy a specification of a PC card of the so-called Type (II).

FIG. 2(c), taken on line 103—103 of FIG. 1, shows a boundary portion between the disk/actuator chamber 25 and the package chamber 26. The housing rib 18 at the boundary portion has a cutout portion 27 for head loading, and a cutout portion 28 for extending the head/coil FPC 14 and the motor FPC 15. Projections 19a and 19b provided on the disk/actuator cover 19 are fitted in the cutout portions 27, 28 to close them, respectively. The mating faces respectively formed between the cutout portions 27, 28 and the projections 19a, 19b are bent stepwise in the direction of the thickness of the device. In this embodiment, each mating face is closed by a tape seal 29 (shown in widely spaced cross-hatched lines for clarity) having a width portion selectively extended to cover a stepwise bent portion of the mating face, to prevent external dust from permeating the HDA, thus ensuring a high reliability. The details will be disclosed with reference to FIGS. 6 and 7. It is to be noted that housing 17 is shown in FIG. 2(c) in cross section with relatively narrowly spaced cross hatching.

Figure 11:
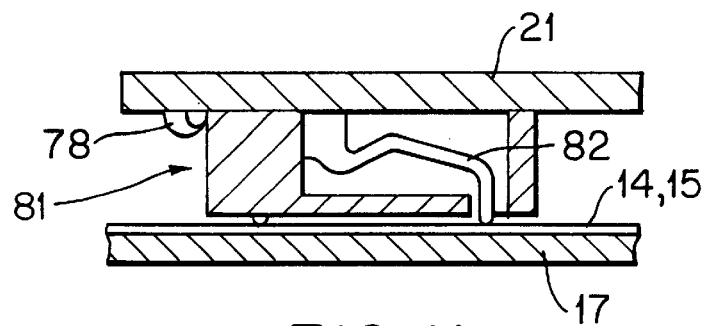
FIG. 11 is a sectional view of a further configuration of the connector for connecting a head/coil FPC and a motor FPC to a circuit board of a control package for the magnetic disk device of FIG. 1.

The circuit board 21 of the control package 22 is positioned at a center of the device in the thickness direction. The integrated circuit elements 20 such as an IC or LSI and the electronic circuit parts are mounted on both surfaces of the circuit board 21. One-end of the head/coil FPC 14 and the motor FPC 15 are electrically connected to the circuit board 21 through the connector 16. As the connector 16, for example, a spring type connector 81 shown in FIG. 11 is used. A positioning hole 73-a and a fixing hole 73-c are located at such positions as to put the connector 16 therebetween. The connector 16 (connector 81) and the FPCs are clamped in the direction of the thickness of the device by the fastening force of a screw 73-d passing through the positioning hole 73-a and a screw (not shown) passing through the fixing hole 73-c, so that a conductor 82 of the connector 81 is deflected to and brought in press-contact with the headcoil FPC 14 and the motor FPC 15. This is effective to keep sufficient electric contact between the conductor 82 of the connector 81 and the head-coil FPC 14 and the motor FPC 15 due to deflection of the conductor 82.

Figure 3:
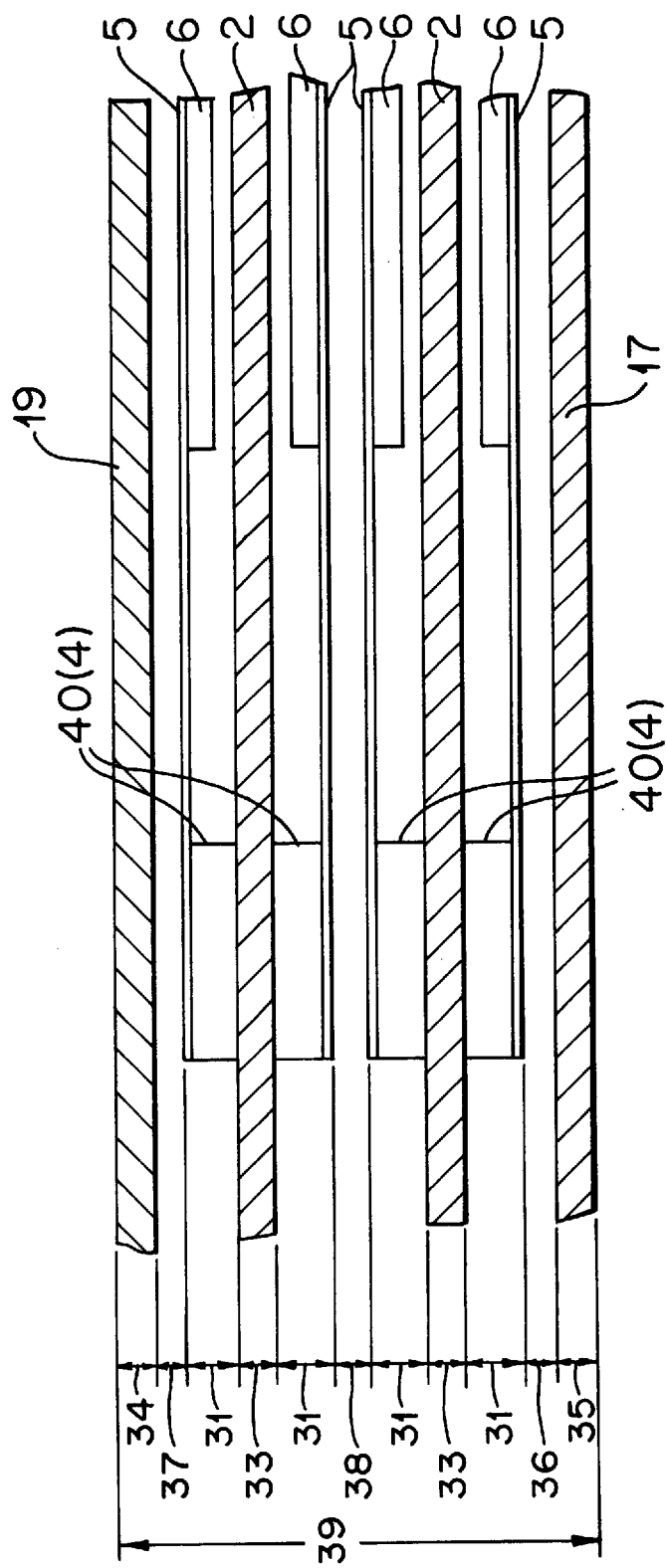
FIG. 3 is a detailed view of a portion of the magnetic disk device of FIG. 1 showing the mounting portion for mounting the magnetic disks and the sliders.

FIG. 3 is an enlarged view of a mounting portion of the sliders 4 and the magnetic disks 2 in the HDA shown in FIG. 1. Referring to FIG. 3, a specification in which a thickness of the head/disk mounting portion is set at 5 mm or less and in which the magnetic disk device 1 has two magnetic disks is disclosed.

With respect to a slider size of a nano-slider, manufacturers have agreed to a specified size (thickness: 0.4 to 0.43 mm) recommended by IDEMA. As the slider 4 shown in FIG. 3, the nano-slider 40 is used. A prototype arm integrated suspension using a suspension of Type 1950 produced by Hutchinson Technology Incorporated (USA) has a height 31 of 0.582 mm. A thickness of the suspension 5 is 0.064 mm; a thickness 33 of the magnetic disk 2 is 0.381 mm (0.015 inch); a thickness 35 of the housing 17 is 0.4 mm; a thickness 34 of the disk/actuator cover 19 is 0.4 mm; a gap 36 between the outermost suspension 5 and the housing 17 is 0.302 mm; a gap 37 between the outermost suspension 5 and the disk/actuator cover 19 is 0.302 mm; and a gap 38 between the nano-sliders 40 including the suspensions 5 is 0.406 mm. The total thickness 39 becomes 4.9 mm. This proves that a head/disk mounting portion having a thickness of 5 mm or less can be realized using commercially available parts assembled according to the present invention.

Figure 4:
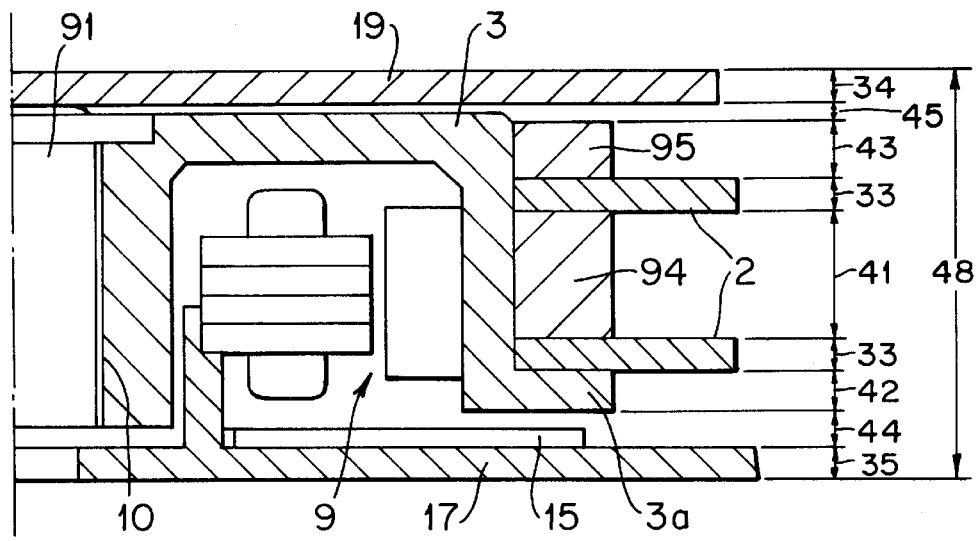
FIG. 4 is a detailed view of a spindle portion of the magnetic disk device shown in FIG. 1.

FIG. 4 is an enlarged view of the spindle portion shown in FIG. 1 and FIGS. 2(a) to 2(c). Referring to FIG. 4, the specification in which a thickness of the spindle portion is set to be at 5 mm or less is explained for a magnetic disk device 1 in which two disks are mounted.

A thickness 33 of the magnetic disk 2 is 0.381 mm; a thickness 41 of the spacer 94 is 1.57 mm; a thickness 42 of a hub flange 3a of the spindle 3 is 0.5 mm; a thickness 43 of a clamp 95 is 0.684 mm; a gap 44 between the hub flange 3a and the housing 17 is 0.384 mm; a gap 45 between the clamp 95 and the disk/actuator cover 19 is 0.2 mm; a thickness 35 of the housing 17 is 0.4 mm; and a thickness 34 of the disk/actuator cover 19 is 0.4 mm. The total thickness 48 becomes 4.9 mm. This proves a spindle portion having a thickness of 5 mm or less can be realized according to the invention.

Figure 5:
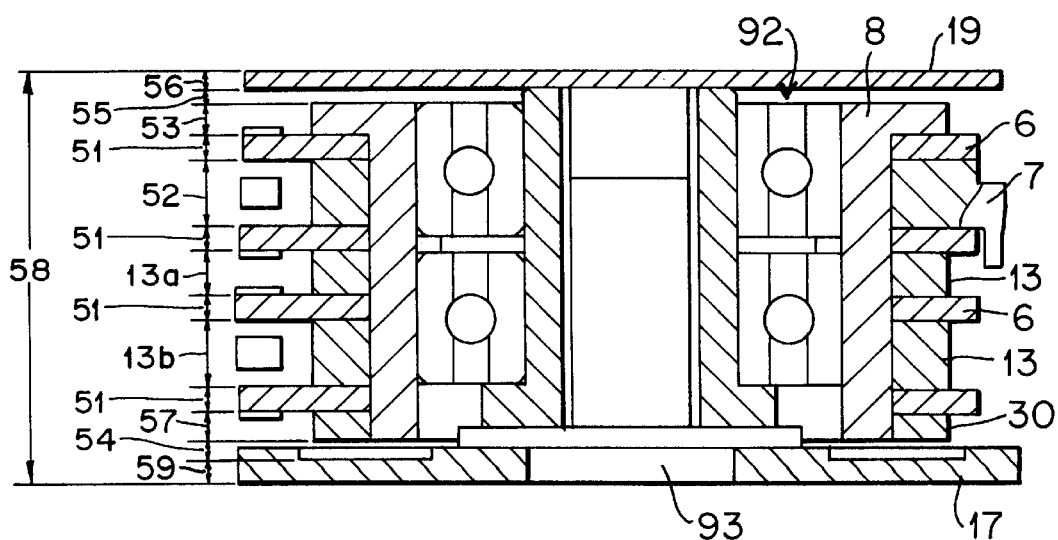
FIG. 5 is a detailed view of an actuator portion of the magnetic disk device shown in FIG. 1.

FIG. 5 is an enlarged view of the actuator portion shown in FIG. 1 and FIGS. 2(a) to 2(c). Referring to FIG. 5, the specification in which a thickness of the actuator portion is set at 5 mm or less is explained for a magnetic disk device 1 in which two magnetic disks are mounted.

A thickness 51 of the guide arm 6 of the guide arm integrated suspension is 0.3 mm; a thickness 52 of the coil holder 7 is 0.817 mm; a thickness 13a of the first space 13 is 0.5 mm; a thickness 13b of the second spacer 13 is 0.817 mm; a thickness 53 of a pivot sleeve flange 8a is 0.366 mm; a gap 54 between the end surface of the pivot sleeve 8 and the housing 17 is 0.166 mm; a gap 55 between the pivot sleeve flange 8a and the disk/actuator cover 19 is 0.2 mm; a thickness 59 of the housing 17 is 0.25 mm; a thickness 56 of the disk/actuator cover 19 is 0.2 mm; and a thickness 57 of a pivot clamp 30 is 0.35 mm. The total thickness 58 becomes 4.9 mm. This proves that n actuator portion having a thickness of 5 mm or less can be realized according to the invention.

In summary, the magnetic disk device having two magnetic disks especially as shown in FIGS. 3, 4, 5 is proven to satisfy a specification in which the device thickness (H) is set at 5 mm or less. Accordingly, in this embodiment, it is possible to realize a magnetic disk device having a large memory capacity with a small and thin structure.

In this embodiment, especially shown in FIGS. 3, 4 and 5, since the nano-slider 40 is used as the slider 4, a head load is about 3.5 gf. Assuming an inter peripheral CSS (Contact Start Stop) and a friction coefficient=1, the total head load upon start of the motor becomes 14 gf×cm [=3.5 gf×1 cm×1×4 (number of heads)]. On the other hand, in the case of using the spindle motor 9 having dimensions being small enough to be contained in the inside diameter portions of two pieces of the 1.8 inch magnetic disks as shown in this embodiment, it has been known by examination (calculation) that a starting torque allocated for head loading is about 6 gf×cm even if a motor space is maximized and a dynamic bearing 10 having high impact resistance is used. As a result, it is required to additionally mount a load/unload mechanism (not shown) for separating the slider 4 from the surface of the magnetic disk 2 upon starting the rotation of the magnetic disk 2.

Figure 6:
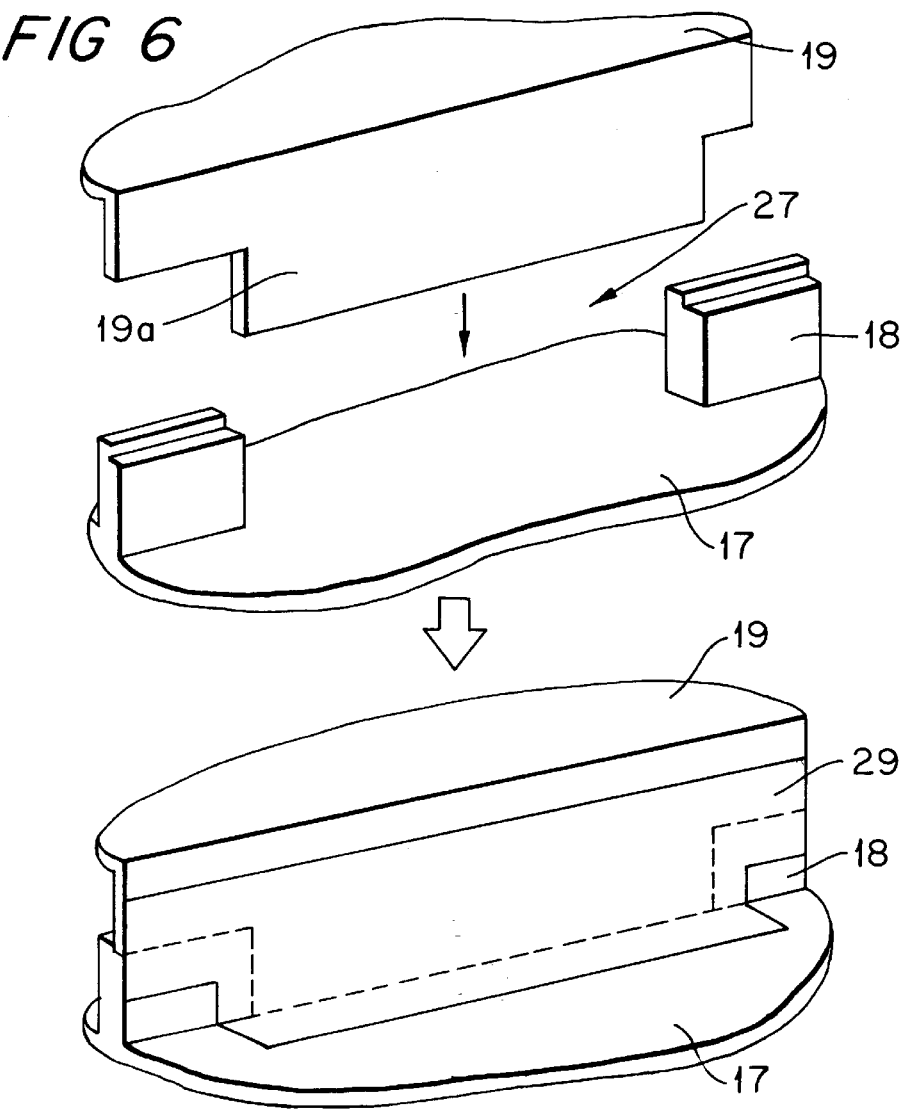
FIG. 6 is a detailed perspective view of a tape seal portion adhered to cover a cut out portion provided for head loading in a housing rib of the magnetic disk device shown in FIG. 1.

FIG. 6 is an enlarged perspective view of a tape seal portion adhered to the cutout portion 27 for head loading which is formed in the housing rib 18 shown in FIG. 1 and FIGS. 2(a) to 2(c). The cutout portion 27 for head loading is required to be formed in the housing rib 18. On the other hand, the projection 19a to be fitted in the cutout portion 27 is provided on a portion of the disk/actuator cover 19. A tape seal having a width portion selectively extended to cover a stepwise bent mating face between the cutout portion 27 and the projection 19a is adhered to the mating portion, to thus provide adequate sealing.

Figure 7:
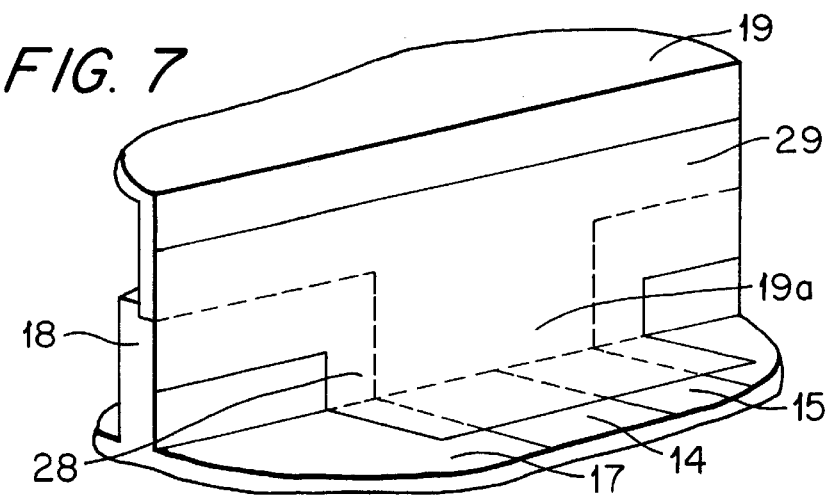
FIG. 7 is a detailed perspective view of a tape seal portion adhered to cover a cut out portion provided for extending FPCs in a housing rib of the magnetic disk device shown in FIG. 1.

FIG. 7 is an enlarged perspective view of a tape seal portion adhered to the cutout portion 28 for extending the FPCs which is formed in the housing rib 18 shown in FIG. 1 and FIGS. 2(a) to 2(c). The cutout portion 28 for extending the head/coil FPC 14 and the motor FPC 15 is formed in the housing rib 18. On the other hand, the projection 19b to be fitted in the cutout portion 28 is formed on a portion of the disk/actuator cover 19. A tape seal 29 having a shape to cover a stepwise bent mating face between the cutout portion 28 and the projection 19b is adhered to the mating face, to thus provide adequate sealing.

In addition, the structure extending the head/coil FPC 14 and the motor FPC 15 through the housing rib 18 is not limited to that shown in FIG. 7. For example, the following structure shown in FIG. 8 may be adopted.

Figure 8:
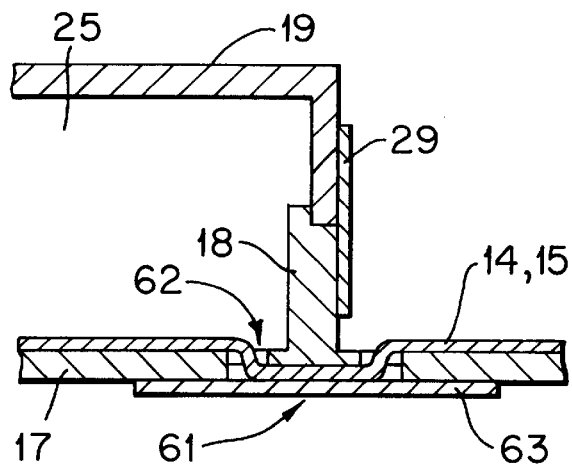
FIG. 8 is a detailed sectional view of a through hole structure formed in a base end of a housing rib of the magnetic disk device shown in FIG. 1.

FIG. 8 is an enlarged sectional view of a structure of a though-hole 61 through which the FPXs extend bypassing the housing rib 18. The through hole is formed in the base end of the housing rib 18 in the magnetic disk device 1 shown in FIG. 1 and FIGS. 2(a) to 2(c). Specifically, through-hole 61 is formed in a lower portion of the housing rib 18 for extending the head/coil FPC 14 and the motor FPC 15 from the disk/actuator chamber 25 to the package chamber 26 therethrough. After the head/coil FPC 14 and the motor FPC 15 pass the through-hole 61, the through-hole 61 is buried with an adhesive 62, to improve a sealing performance of the through-hole 61. At that time, portions of the head/coil FPC 14 and the motor FPC 15 exposed from the housing to the exterior are protected by a protective seal 63.

The magnetic disk device 1 having a high reliability can be realized using each of the above-described sealing structures for the HDA (disk/actuator chamber 25).

Figure 9:
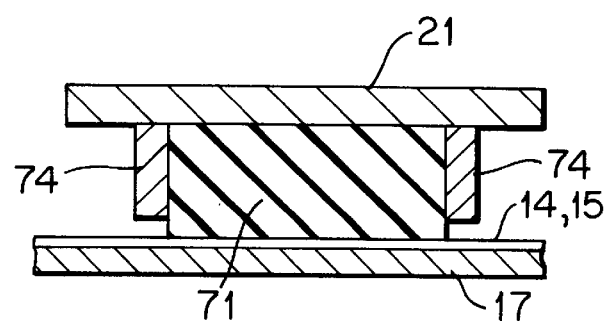
FIG. 9 is a sectional view of a connector for connecting a head head/coil FPC and a motor FPC to a circuit board of a control package for the magnetic disk device shown in FIG. 1.
Figure 10:
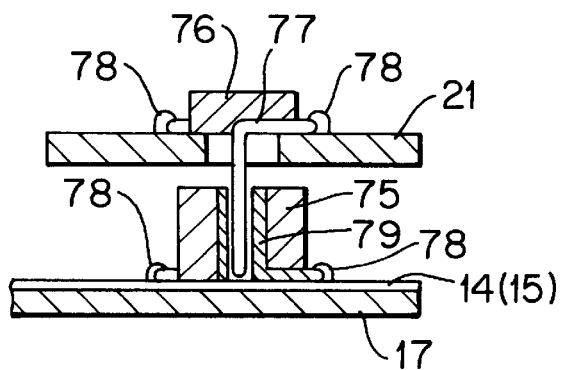
FIG. 10 is a sectional view of another configuration of a connector for connecting a head/coil FPC and a motor FPC to a circuit board of a control package for the magnetic disk device shown in FIG. 1.

FIGS. 9, 10, 11 are sectional views showing various configurations of the connector for connecting the head/coil FPC 14 and the motor FPC 15 to the circuit board 21 of the control package 22.

The configuration shown in FIG. 9 uses an elastic connector 71 having a structure in which conducting layers and insulating layers are laminated to each other, or a structure in which a plurality of conducting portions are wrapped with an insulator. In the connector shown in FIG. 9, the elastic connector 71 has a plurality of conductor patterns which extend in the thickness direction and are exposed to both the upper and lower surfaces. The elastic connector 71 is held and deflected between the circuit board 21 and the head/coil FPC 14 and the motor FPC 15, so that a group of connecting terminals (not shown) exposed to the upper surfaces of the head/coil FPC 14 and the motor FPC 15 on the housing 17 are electrically connected through the conductor patterns to a group of connecting terminals (not shown) exposed to the lower surface of the circuit board 21 in a specified one-to-one relation. Such an elastic connector 71 is commercially available by several makers. Since the circuit board 21 is positioned with respect to the head/coil FPC 14 and the motor FPC 15 by the positioning pins 72 of the FPCs and the positioning holes 73-a and 73-b formed in the circuit board 21 (see FIG. 1), the positioning of the elastic connector 71 is not required. For example, a positioning case 74 for holding the elastic connector 71 may be provided on the lower surface of the circuit board 21.

FIG. 10 shows another configuration of the connector, which uses a connector 76 provided on the circuit board 21 and a connector 75 provided on the head/coil FPC side 14 and the motor FPC 15. Specifically, the male connector 76 having a pin-type conductor 77 is mounted on the circuit board 21, and the conductor 77 is connected to the circuit board 21 by solder 78. In the female connector 75 provided on the head/coil FPC 14 and the motor FPC 15, a cylindrical conductor 79 into which the pin-like conductor 77 is pressed is connected to a conductor pattern (not shown) formed on the head/coil FPC 14 and the motor FPC 15 by means of a solder 78. The disposition of the male and female connectors may be reversed with respect to each other. The positioning of the connectors 75 and 76 is performed using the positioning pins 72 of the FPCs and the positioning holes 73-a, 73-b of the circuit board 21 (see FIG. 1).

FIG. 11 shows a further configuration of the connector. A spring type connector 81 [for example, "Amp P2" (trade name) manufactured by AMP Incorporated] provided on the circuit board 21 is positioned and pressed to engage the head/coil FPC 14 and the motor FPC 15 for electric connection. Specifically, the positioning of the connector 81 is performed using the positioning pins 72 of the FPCs and the positioning holes 73-a and 73-b of the circuit board 21 (see FIG. 1). An approximately L-shaped elastic conductor 82 of the connector 81 is connected at its base end to the circuit board 21 by a solder 78, and is electrically pressed at its leading end to the conductor patterns (not shown) of the head/coil FPC 14 and the motor FPC 15 by deflection of the conductor 82. The head/coil FPC 14 and the motor FPC 15 are adhered to the specified positions of the housing 17 by an adhesive tape or the like. The connector 16 shown in FIG. 1 adopts such a spring type connector 81.

Embodiment 2

Figure 12:
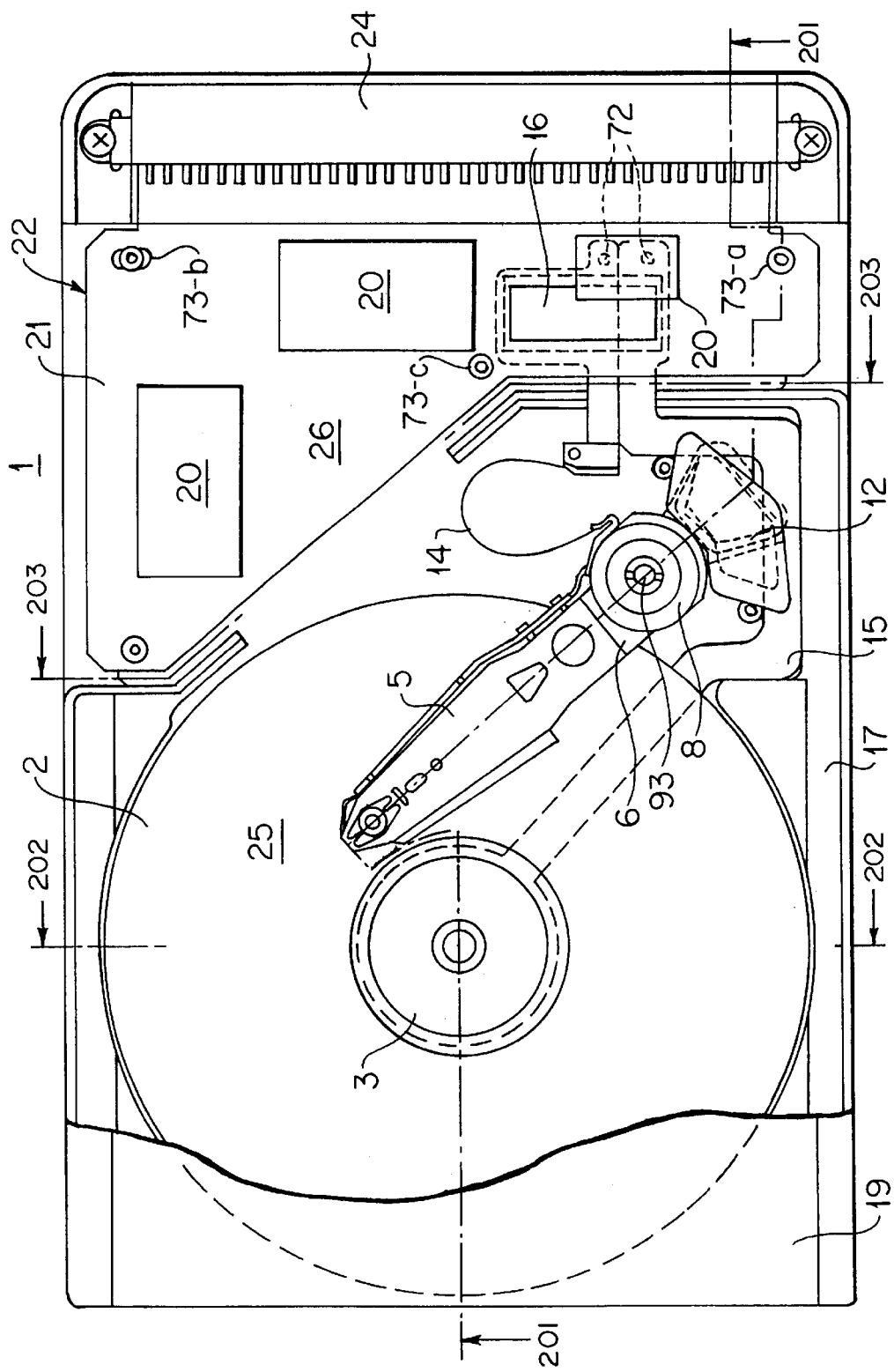
FIG. 12 is a plan view of a second embodiment of a magnetic disk device of the present invention, partially cut away to shown details of the interior parts.

FIG. 12 is a plan view of a configuration of another embodiment of the magnetic disk device of the present invention, with parts partially cutaway. FIGS. 13(a), 13(b) and 13(c) are sectional views taken on lines 201—201, 202—202, 203—203 of FIG. 12, respectively.

The magnetic disk device in this embodiment shown in FIG. 12 and FIGS. 13(a) to 13(c) is substantially similar in basic configuration to that shown in FIG. 1, and therefore, parts corresponding to those shown in FIG. 1 are indicated with the same characters and the explanation thereof is omitted.

Although Embodiment 1 shown in FIG. 1 and FIGS. 2(a) to 2(c) has the configuration for mounting two magnetic disks, the embodiment shown in FIG. 12 and FIGS. 13(a) to 13(c) has a configuration for mounting three magnetic disks. In this embodiment, however, a width W2 of a projection (thickness H2: 3.3 mm) formed on each end of the housing 17 to be fitted in a PC card slot of a mating apparatus (not shown) must be changed from a standard value of Type (II), 3 mm to a standard value of Type (III), 1.5 mm for ensuring a containing space for the increased number of the magnetic disks. The shapes of the PC card slots of information processing apparatuses commercially available at present are substantially common to the specifications of Type (II) and Type (III), and accordingly, a modified specification of Type (II) in which the width W2 is changed to 1.5 mm as the standard value of Type (III) can be substantially distributed as the specification of Type (II). If Type (II) of HDD is popularized, the standard value of the width W2 in Type (II) is desirable to be unified with the existing value, 3 mm (width W1 in Embodiment 1) to the standard value of Type (III), 1.5 mm (width W2 in Embodiment 2). The reason why the magnetic disk device having a thickness of 5 mm or less can mount three magnetic disks 2 is that the slider is changed from a nano-slider to a pico-slider smaller in size than the nano-slider type and the thickness of a magnetic disk 2 is changed from 0.381 mm (0.015 inch) to 0.305 mm (0.012 inch). A research company reports that the pico-slider has almost come into practical use, and a magnetic disk 2 having a thickness of about 0.305 mm is currently under development. The pico-slider and the magnetic disk 2 having a thickness of about 0.305 mm are expected to be produced on a large scale after two or three years. If so, it is possible to realize a magnetic disk device having a thickness of 5 mm or less in which a pico-slider is used and two magnetic disks are mounted. In such a magnetic disk device having a dimensional allowance, a gap between parts and the thickness of housing or cover can be increased for enhancing a resistance against deformation during handling. Also, if a head smaller than the pico-slider is realized, three magnetic disks can be easily mounted. In addition, if the magnetic disk 2 and guide arm are fastened using an adhesive in combination with a clamp member, a clamp strength can be reinforced.

FIG. 13(c), taken on line 203—203 of FIG. 12, shows a boundary portion between the disk/actuator chamber 25 and the package chamber 26. The housing rib 18 at the boundary portion has a cutout portion 27 for head loading, and a cutout portion 28 for extending the head/coil FPC 14 and the motor FPC 15. Projections 19a and 19b provided on the disk/actuator cover 19 are fitted in the cutout portions 27, 28 to close them, respectively. The mating faces respectively formed between the cutout portions 27, 28 and the projections 19a, 19b are bent stepwise in the direction of the thickness of the device. In this embodiment, each mating face is closed by a tape seal 29 (shown cross hatch lines for clarity) with a width portion selectively extended to cover a stepwise bent portion of the mating face, to prevent external dust from permeating the HDA, thus ensuring high reliability. The details are described with reference to FIGS. 6 and 7. It is noted that the housing 17 is also shown in cross section by cross hatching.

The circuit board 21 of the control package 22 is positioned at a center of the device in the thickness direction. The integrated circuit elements 20 such as an IC or LSI and electronic circuit parts are mounted on both surfaces of the circuit board 21. One-end of the head/coil FPC 14 and the motor FPC 15 are electrically connected to the circuit board 21 through the connector 16. As the connector 16, for example, a spring type connector 81 shown in FIG. 11 is used. A positioning hole 73-a and a fixing hole 73-c are located at such positions as to put the connector 16 therebetween. The connector 16 (connector 81) and the FPCs are clamped in the direction of the thickness of the device by the fastening force of a screw 73-d passing through the positioning hole 73-a and a screw (not shown) passing through the fixing hole 73-c, so that a conductor 82 of the connector 81 is deflected to and brought in pressing engagement with the head-coil FPC 14 and the motor FPC 15. This is effective to keep a sufficient electric connection between the conductor 82 of the connector 81 and the head-coil FPC 14 and the motor FPC 15 due to deflection of the conductor 82.

Figure 14:
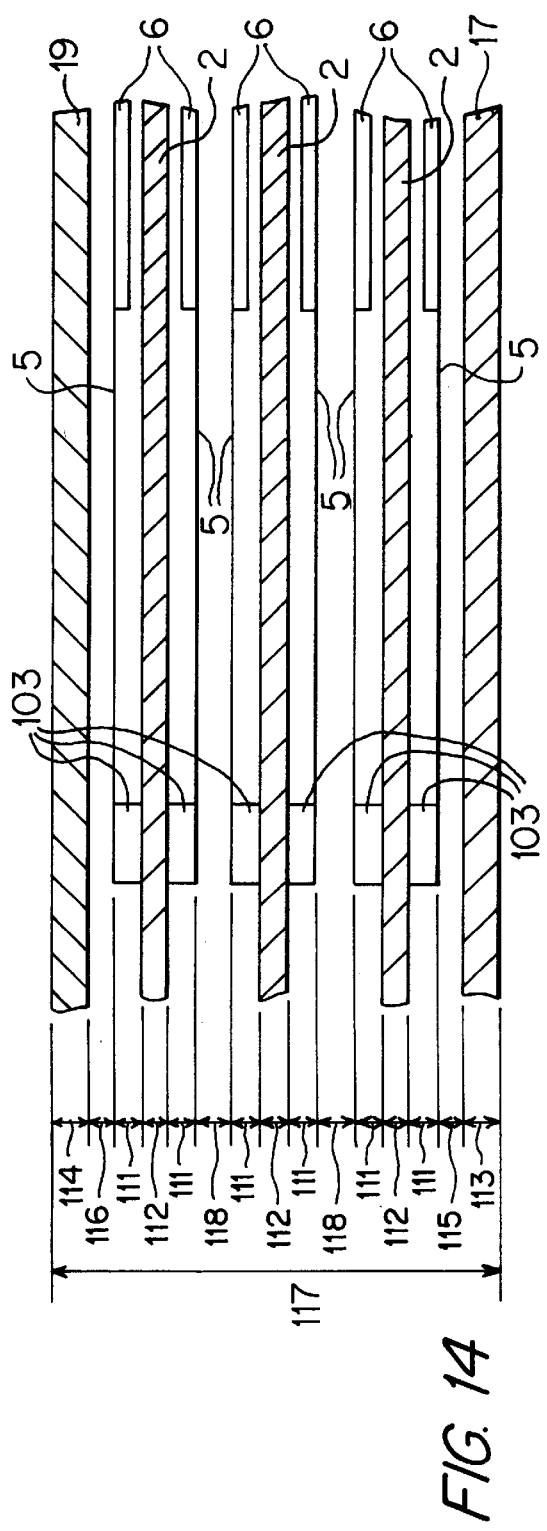
FIG. 14 is a detailed view of a portion of the magnetic disk device of FIG. 12 showing the mounting portion for mounting the magnetic disks and the sliders.
Figure 15:
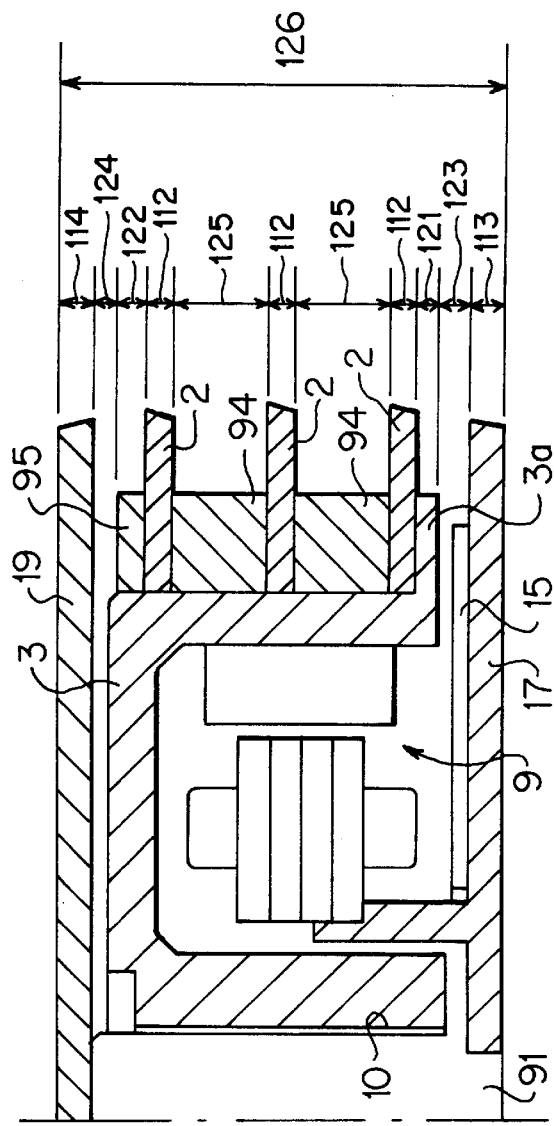
FIG. 15 is a detailed view of a spindle portion of the magnetic disk device shown in FIG. 12.
Figure 16:
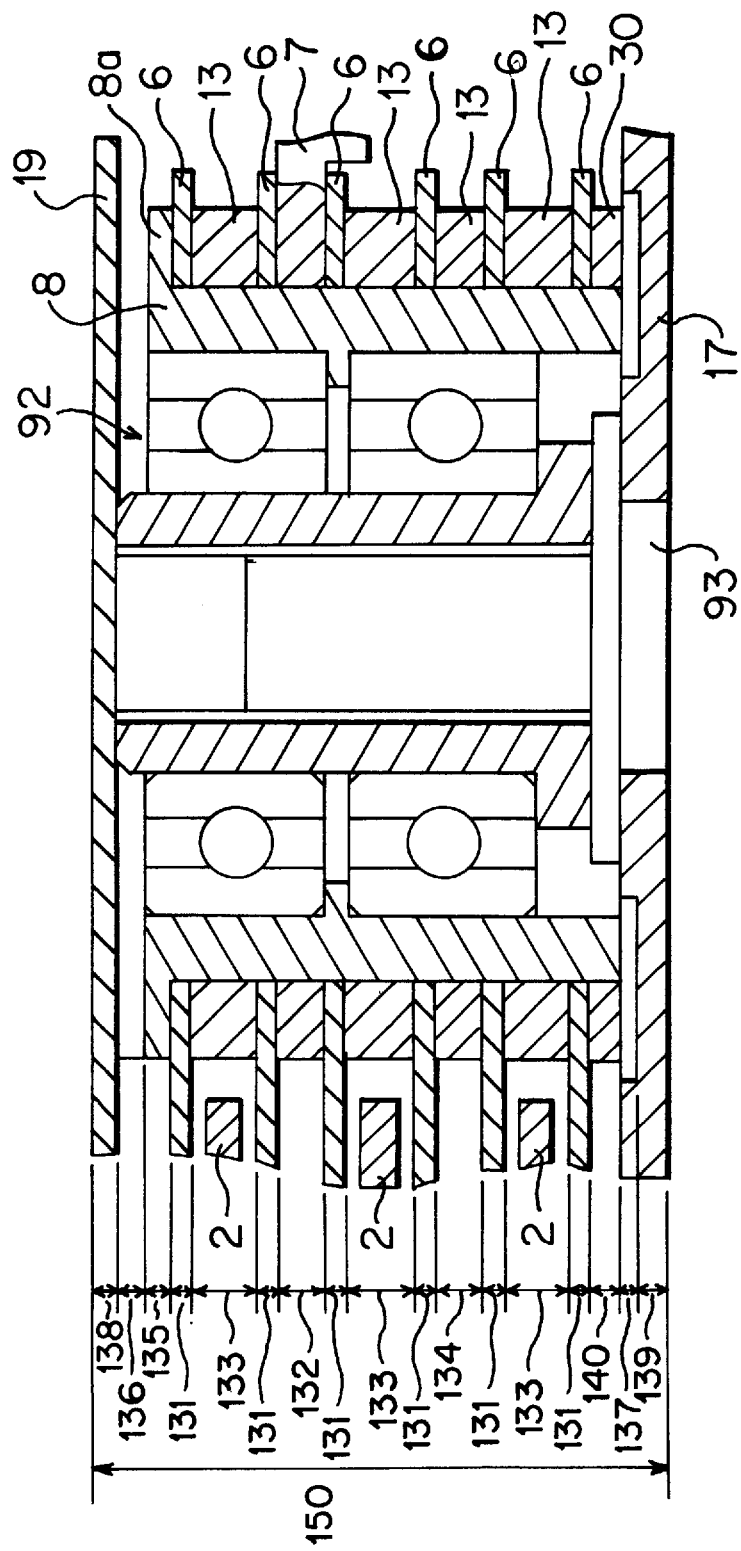
FIG. 16 is a detailed view of an actuator portion of the magnetic disk device shown in FIG. 12.

Referring to FIGS. 14, 15, 16, a specification in which the device thickness is set at 5 mm or less for a magnetic disk device having three magnetic disks will be described.

FIG. 14 is an enlarged view of the head/disk mounting portion shown in FIG. 12. Referring to FIG. 14, a thickness of a pico-slider 103 is 0.3 mm in accordance with IDEMA. The mass of the pico-slider 103 is about 1/3.5 of that of the nano-slider. As a result, it becomes possible to obtain an impact/vibration resistance and a floating characteristic that is basically similar to those in the case of using the nano-slider by reducing the mass of the suspension 5 to about 1/3.5 and also reducing the head load to about 1/3.5. Thus, a thickness of the suspension 5 is changed from 0.064 mm in this embodiment to 0.025 mm, and a height 111 of an arm integrated type suspension becomes about 0.325 mm in the case of using a pivotless supporting system. A thickness 112 of the disk is 0.305 mm (0.012 inch), a thickness 113 of the housing is 0.4 mm, a thickness 114 of the disk/actuator cover is 0.4 mm, a gap 115 between the head at the arrangement end (the suspension 5 supporting the pico-slider 103) and the housing is 0.2175 mm, a gap 116 between the head at the arrangement end and the disk/actuator cover 19 is 0.2175 mm, and a gap 118 between the heads is 0.4 mm. The total thickness 117 becomes 4.9 mm. This proves that a head/disk mounting portion having a thickness of 5 mm or less can be realized.

The head load is reduced to about 1/3.5, that is, it is changed from 3.5 gf to 1 gf. There is a possibility of a head load of about 0.5 gf. Accordingly, the total head load becomes (3 to 6) gf~cm [=(0.5 to 1) gf~6 (heads)]. In the case of using the pico-slider 103, a magnetic disk device eliminates the necessity of providing a load/unload mechanism upon startup of rotation of the magnetic disks 2.

FIG. 15 is an enlarged view of a spindle portion shown in FIG. 12. Referring to FIG. 15, a thickness 112 of the magnetic disk 2 is 0.305 mm, a thickness 125 of the spacer 94 is 1.05 mm, a thickness 121 of a hub flange 3a of the spindle 3 is 0.2925 mm, a thickness 122 of a clamp 95 is 0.3425 mm, a gap 123 between the hub flange 3a and the housing 17 is 0.25 mm, a gap 124 between the clamp 95 and the disk/actuator cover 19 is 0.2 mm, a thickness 113 of the housing is 0.4 mm, and a thickness 114 of the disk/actuator cover is 0.4 mm. The total thickness 126 becomes 4.9 mm. This proves that the head/disk mounting portion having a thickness of 5 mm or less can be realized.

FIG. 16 is an enlarged view of an actuator portion in FIG. 12. Referring to FIG. 16, a thickness 131 of the guide arm integrated type suspension is 0.15 mm, a thickness 132 of the coil holder is 0.45 mm, a thickness 133 of the first spacer is 0.605 mm, a thickness 134 of the second spacer is 0.45 mm, a thickness 135 of a pivot sleeve flange 8a is 0.2425 mm, a gap 137 between the end surface of the pivot sleeve 8 and the housing 17 is 0.15 mm, a gap 136 between the pivot sleeve flange 8a and the disk/actuator cover 19 is 0.2 mm, a thickness 139 of the housing is 0.25 mm, a thickness 140 of a pivot clamp is 0.2425 mm, and a thickness 138 of the disk/actuator cover is 0.2 mm. The total thickness 150 becomes 4.9 mm. This proves that an actuator portion having a thickness of 5 mm or less can be realized.

Thus, in this embodiment, three magnetic disks 2 can be mounted in a housing having a device thickness of 5 mm or less. Accordingly, it is possible to realize a magnetic disk device having a large capacity with a small and thin structure.

The sealing of the disk/actuator chamber 25 in FIG. 12 can be performed in the same manner as described with reference to FIGS. 6, 7 and 8, and therefore, the explanation thereof is omitted. The mounting of the connector can also be performed in the same manner as described with reference to FIGS. 9, 10, 11, and therefore, the explanation thereof is omitted.

Embodiments 3 and 4

The magnetic disk devices of Embodiments 3 and 4 have several components. The first three components for each of these embodiments are the same three components A–C described with reference to FIG. 1 and FIGS. 2(a)–2(c). Accordingly, a description of these three components is omitted. Further, elements of these embodiments that are in common with those of embodiment 1 are shown with the same reference numbers, and only new or modified elements are described with new reference numbers.

Figure 17:
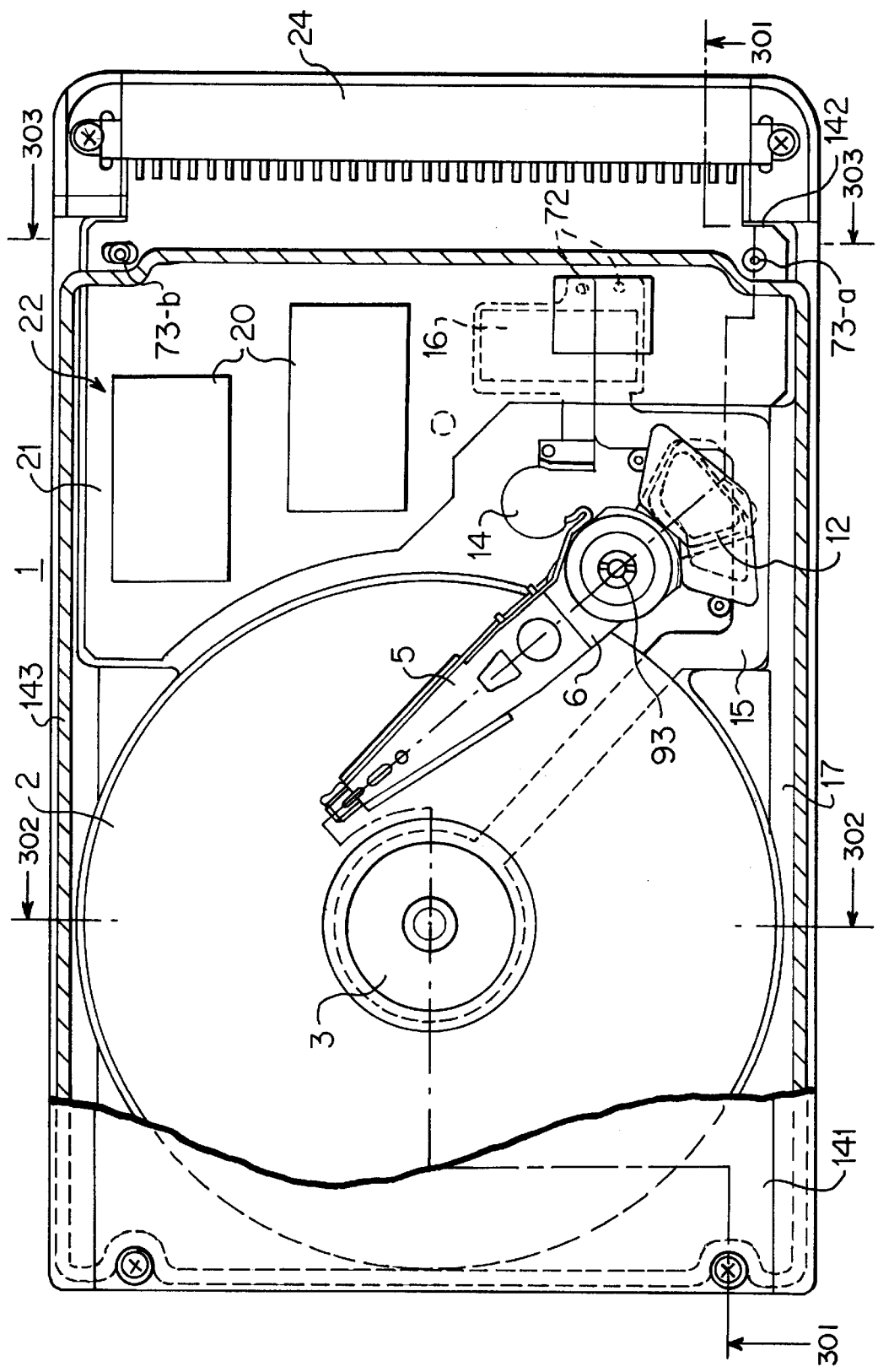
FIG. 17 is a plan view of a third embodiment of a magnetic disk device of the present invention, partially cut away to shown details of the interior parts.

FIG. 17 is a plan view of a configuration of the third embodiment of the magnetic disk device of the present invention, with parts partially cutaway to show the interior of the device. FIG. 18(a), 18(b) and 18(c) are sectional views taken on lines 301—301, 302—302, and 303—303 of FIG. 17, respectively.

Referring to FIG. 17 and FIGS. 18(a) to 18(c), and recalling that a detailed description of the first through third components thereof has been deemed unnecessary, a fourth component includes a housing 17 for supporting the spindle system 1a and the actuator system 1b. The fifth component is a control package 22 assembled by integrated circuit elements 20 such as an IC or LSI, electronic circuit parts (not shown) other than the integrated circuit elements 20, and a circuit board 21. The sixth component is a package chamber 26 including a housing 17 and the package cover 141. The seventh component is a PCMCIA connector 24 fixed by the housing 17 and a cover 141.

The magnetic disk device in the embodiment shown in FIG. 17 and FIGS. 18(a) to 18(c) has a sealing structure in which a disk/actuator chamber and a package chamber are sealed together. Specifically, the circuit board 21 of the control package 22 is adhesively mounted in a groove 142 provided in the housing 17 (see FIG. 18(c)) such that a main surface of the circuit board 21 is at the same level as the mating face of the housing 17 is to the cover 141, and a packing 143 (shown by cross hatching for clarity) is held between the mating face of the housing 17, part of the circuit board 21, and the cover 141, to thus ensure a good seal. This makes it possible to prevent external dust from permeating into the interior, and hence ensures a highly reliable magnetic disk device.

Embodiment 4

Figure 19:
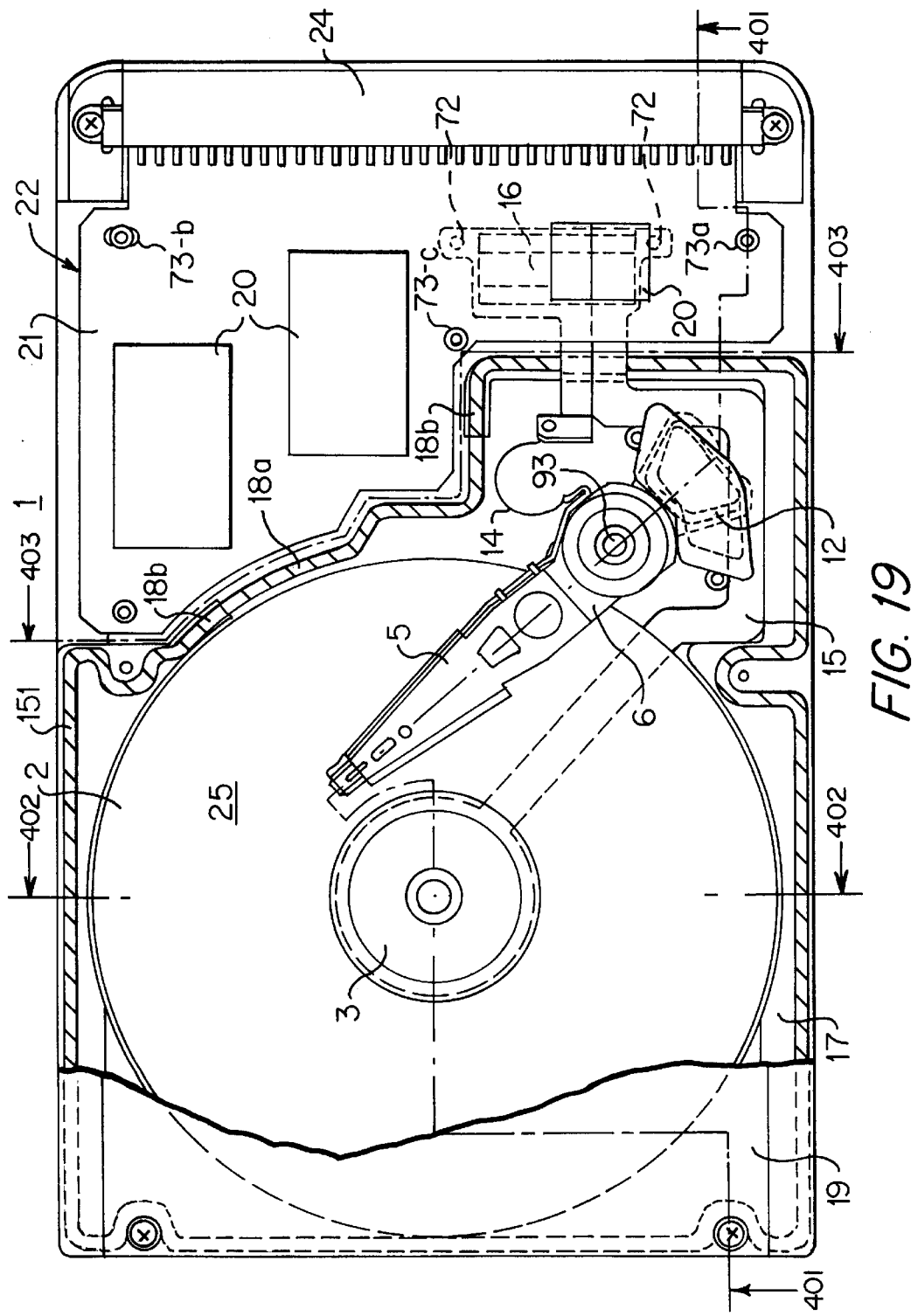
FIG. 19 is a plan view of a fourth embodiment of a magnetic disk device of the present invention, partially cut away to shown details of the interior parts.
Figure 20A:
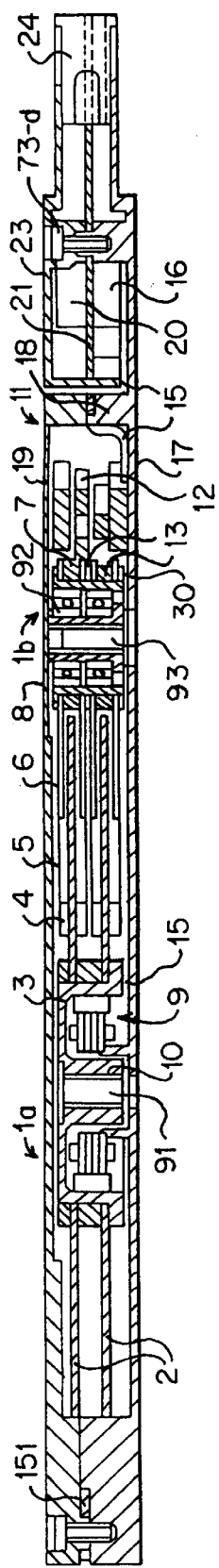
FIGS. 20(a), 20(b) and 20(c) are sectional views taken along lines 401—401, 402—402 and 403—403, respectively, as shown in FIG. 19.
Figure 20B:
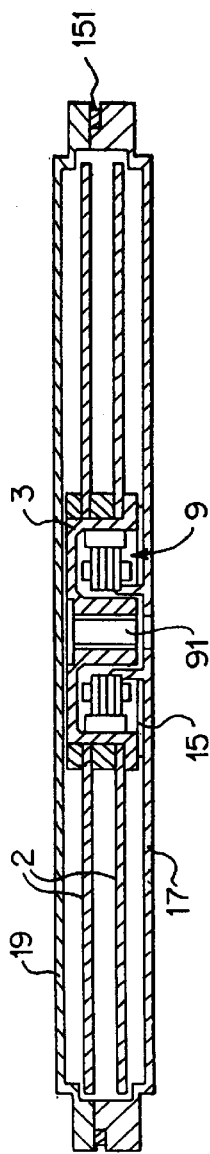
Figure 20C:
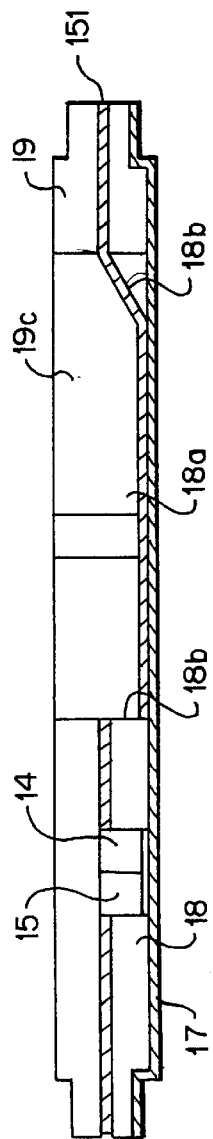

FIG. 19 is a plan view of a configuration of a fourth embodiment of the magnetic disk device of the present invention, partially cutaway. FIGS. 20(a), 20(b) and 20(c) are sectional views taken on lines 401—401, 402—402 and 403—403, respectively.

In this embodiment, a disk/actuator chamber 25 is separated from a package chamber 26 in such a manner as to ensure a high sealing performance of the disk/actuator chamber 25. This embodiment is different from Embodiment 1 in that a packing is used for sealing.

Referring to FIG. 19 and FIGS. 20(a) to 20(c), and again recalling that the description of the first through third component parts have been previously described with reference to Embodiment 1, the magnetic disk device 1 has a disk/actuator chamber 25 as a fourth component including a housing 17 for supporting the spindle system 1a and the actuator system 1b, a housing rib 18, and a disk/actuator cover 19. The fifth component is a control package 22 assembled by integrated circuit elements 20 such as an IC and LSI, electronic circuit parts (not shown) other than the integrated circuit elements 20, and a circuit board 21. The sixth component is a package chamber 26 including a housing 17 and the package cover 23. The seventh component includes a PCMCIA connector 24 held and fixed between the housing 17 and the package cover 23.

In this embodiment, the disk/actuator chamber 25 is separated from the package chamber 26, and a packing 151 is held between the housing rib 18 and the disk/actuator cover 19 to enhance the sealing performance of the disk/actuator chamber 25 (note that the narrowly spaced cross hatched lines show the packing 151 and the wider spaced ones shown in FIG. 20(c) show a cross-section of the housing).

A recessed portion 18a is formed in the housing rib 18 facing to the control package 22 for ensuring a space for head loading, and a projection 19c to be fitted in the recessed portion 18a is formed in the disk/actuator cover 19. Both ends of the recessed portion 18a of the housing rib 18 are formed into smooth slant surfaces 18b. The packing 151 is mounted slantingly along the slant surfaces 18b (see FIG. 20(c)). In FIG. 20(c), only one of the slant surfaces 18b can be viewed from the viewing angle of this figure.

In this case, both the extension of the head/coil FPC 14 and the motor FPC 15 and the improvement in sealing performance can be realized by holding the head/coil FPC 14 and the motor FPC 15 together with the packing 151 between the housing rib 18 and the disk/actuator cover 19. Thus, it is possible to prevent dust from permeating from the exterior, and hence to ensure a high reliability of the magnetic disk device.

Although the structure shown in FIG. 19 contains two magnetic disks 2, it may also be applied to the case containing only one magnetic disk 2. In this case, the mating face between the disk/actuator cover 19 and the housing 17 can be flattened while a gap for head loading is ensured by setting the height of the housing rib 18 such that the mating face is slightly lower than that of the center throughout the entire periphery of the mating face.

In the configuration shown in FIG. 19 and FIGS. 20(a) to 20(c), since the packing 151 passes through the head loading portion, a gap between the disk/actuator cover 19 and the outermost magnetic disk 2 is narrower than that in Embodiment 1 shown in FIG. 1 by 0.05 mm; a gap between the magnetic disks 2 is narrower than that in Embodiment 1 by 0.1 mm; and a gap between the housing 17 and the lowermost magnetic disk 2 is wider than that in Embodiment 1 by 0.15 mm, to thus ensure a mounting space of the packing 151.

As described above, in each embodiment of the present invention, two or three magnetic disks can be mounted in a magnetic disk device having a device thickness (H) of 5 mm or less. This proves that a magnetic disk device having a large capacity with a small and thin structure can be realized. Moreover, a high sealing performance of the disk/actuator chamber 25 for containing magnetic disks 2 can be ensured. This proves that a magnetic disk device having a high reliability can be realized. In particular, the magnetic disk device of the present invention substantially satisfies the PCMCIA standard, and is usable in a state in which it is mounted in a PC card slot provided in a portable small-sized information processing apparatus.

While preferred embodiments have been set forth with specific details, further embodiments, modifications and variations are contemplated according to the broader aspects of the present invention, all as determined by the spirit and scope of the following claims.

We claim:

1. A magnetic disk device, comprising:

said magnetic disk device having an outer thickness within the range of 4.7 mm to 5.0 mm;

a head/disk assembly having:

a spindle for mounting one, two or three magnetic disks;

a spindle motor for driving said spindle in rotation;

a housing for rotatably supporting said spindle through a first bearing;

a transducer for writing/reading information to/from said magnetic disk;

an actuator including
- a slider for mounting said transducer,
- a suspension for supporting said slider,
- a guide arm for supporting said suspension,
- a second bearing for movably guiding said guide arm in the radial direction of said magnetic disk,
- a coil supported on the other side of said guide arm from said suspension with respect to said bearing,
- a magnetic circuit supported by said housing for driving said guide arm in cooperation with said coil;

a cover for forming an enclosed space for containing said magnetic disk and said actuator in cooperation with said housing; and a control package including electronic parts for controlling said head/disk assembly and a circuit board for mounting said electronic parts;

wherein said magnetic disk device is separated into a first chamber for containing said magnetic disks and said actuator and a second chamber for containing said control package, a housing rib projecting from said housing to surround said first chamber in which said magnetic disks and said actuator are disposed, and first and second covers in close-contact with said housing rib.

2. A magnetic disk device according to claim 1, said spindle mounts only two magnetic disks.

3. A magnetic disk device according to claim 1, wherein said magnetic disk device is mounted in a PC card slot and said magnetic disk device has a design specification in accord with PCMCIA/JEIDA standards.

4. A magnetic disk device, comprising:

said magnetic disk device having an outer thickness within the range of 4.7 mm to 5.0 mm;

a head/disk assembly having: a spindle for mounting at least one magnetic disk; a spindle motor for driving said spindle in rotation; a housing for rotatably supporting said spindle through a first bearing; a transducer for writing/reading information to/from said at least one magnetic disk; an actuator including a slider for mounting said transducer, a suspension for supporting said slider, a guide arm for supporting said suspension, a second bearing for movably guiding said guide arm in the radial direction of said at least one magnetic disk, a coil supported on the side of said guide arm, and a magnetic circuit supported by said housing for driving said guide arm in cooperation with said coil; and a cover for forming an enclosed space for containing said at least one magnetic disk and said actuator in cooperation with said housing;

a control package including electronic parts for controlling said head/disk assembly and a circuit board for mounting said electronic parts;

said magnetic disk device being separated into a first chamber for containing said at least one magnetic disk and said actuator and a second chamber for containing said control package, a housing rib projecting from said housing to surround said first chamber in which said at least one magnetic disk and said actuator are disposed, and first and second covers in close-contact with said housing rib;

said magnetic disk device further having at least one of a first sealing structure, a second sealing structure, and a third sealing structure;

said first sealing structure for sealing a first cutout portion for head loading provided in said housing rib; said first cutout portion being closed with a first projection formed on a portion of said first cover; and said first chamber being sealed using a tape seal having a width portion selectively extended in accordance with a shape of said first cutout portion;

said second sealing structure for sealing a second cutout portion through which extends a flexible printed circuit board used for transmission/reception of at least one of a power signal or an electric signal between said head/disk assembly and said control package; said second cutout portion being closed with a second projection formed on a portion of said first cover; and said first chamber being sealed using a tape seal having a width portion selectively extended in accordance with a shape of said second cutout portion; and said third sealing structure for sealing a through-hole passing underneath of said housing rib through which extends a flexible printed circuit board used for transmission/reception of at least one of a power signal or an electric signal between said head/disk assembly and said control package and said first chamber being sealed by closing said through-hole with an adhesive.

5. A magnetic disk device according to claim 4, further including only two of said magnetic disks mounted on said spindle.

6. A magnetic disk device according to claim 4, wherein said magnetic disk device is mounted in a PC card slot and said magnetic disk device has a design specification in accord with PCMCIA/JEIDA standards.

7. A magnetic disk device according to claim 4, further including a connector for connecting said flexible printed circuit board to said circuit board for mounting said electronic parts.

8. A magnetic disk device according to claim 7, wherein said connector is an elastic connector.

9. A magnetic disk device according to claim 7, wherein said connector includes a socket and a pin, each respectively mounted on one of said flexible printed circuit board and said circuit board.

10. A magnetic disk device according to claim 7, wherein said connector includes a spring biased connector structure mounted on one of said flexible printed circuit board and said circuit board and resiliently engaging the other of said flexible printed circuit board and said circuit board.

11. A magnetic disk device, comprising:

said magnetic disk device having an outer thickness within the range of 4.7 mm to 5.0 mm;

a head/disk assembly having:
- a spindle for mounting one, two or three magnetic disks;
- a spindle motor for driving said spindle in rotation;
- a housing for rotatably supporting said spindle through a first bearing;
- a transducer for writing/reading information to/from said magnetic disk;
- an actuator including
  - a slider for mounting said transducer,
  - a suspension for supporting said slider,
  - a guide arm for supporting said suspension,
  - a second bearing for movably guiding said guide arm in the radial direction of said magnetic disk,
  - a coil supported on the side of said guide arm from said suspension with respect to said bearing,
  - a magnetic circuit supported by said housing for driving said guide arm in cooperation with said coil;

a cover for forming an enclosed space for containing said magnetic disk and said actuator in cooperation with said housing; and a control package including electronic parts for controlling said head/disk assembly and a circuit board for mounting said electronic parts;

wherein a groove having a depth approximately equal to a thickness of said circuit board extends along a portion of a mating face of said housing between said housing and said cover; said circuit board is adhered by an adhesive in said groove such that a main surface of said circuit board is at a same level as that of said mating face of said housing; and a packing is held between said mating face, part of said main surface of said circuit board and said cover so that said magnetic disk and said actuator are sealed together with said control package in a common chamber.

12. A magnetic disk device according to claim 11, wherein said magnetic disk device is mounted in a PC card slot and said magnetic disk device has a design specification in accord with PCMCIA/JEIDA standards.

13. A magnetic disk device according to claim 11, further including only two of said magnetic disks mounted on said spindle.

* * * * *